M. E. ELSWORTH.
Harvester Rake.
No. 18,329.
2 Sheets—Sheet 1.
Patented Oct. 6, 1857.
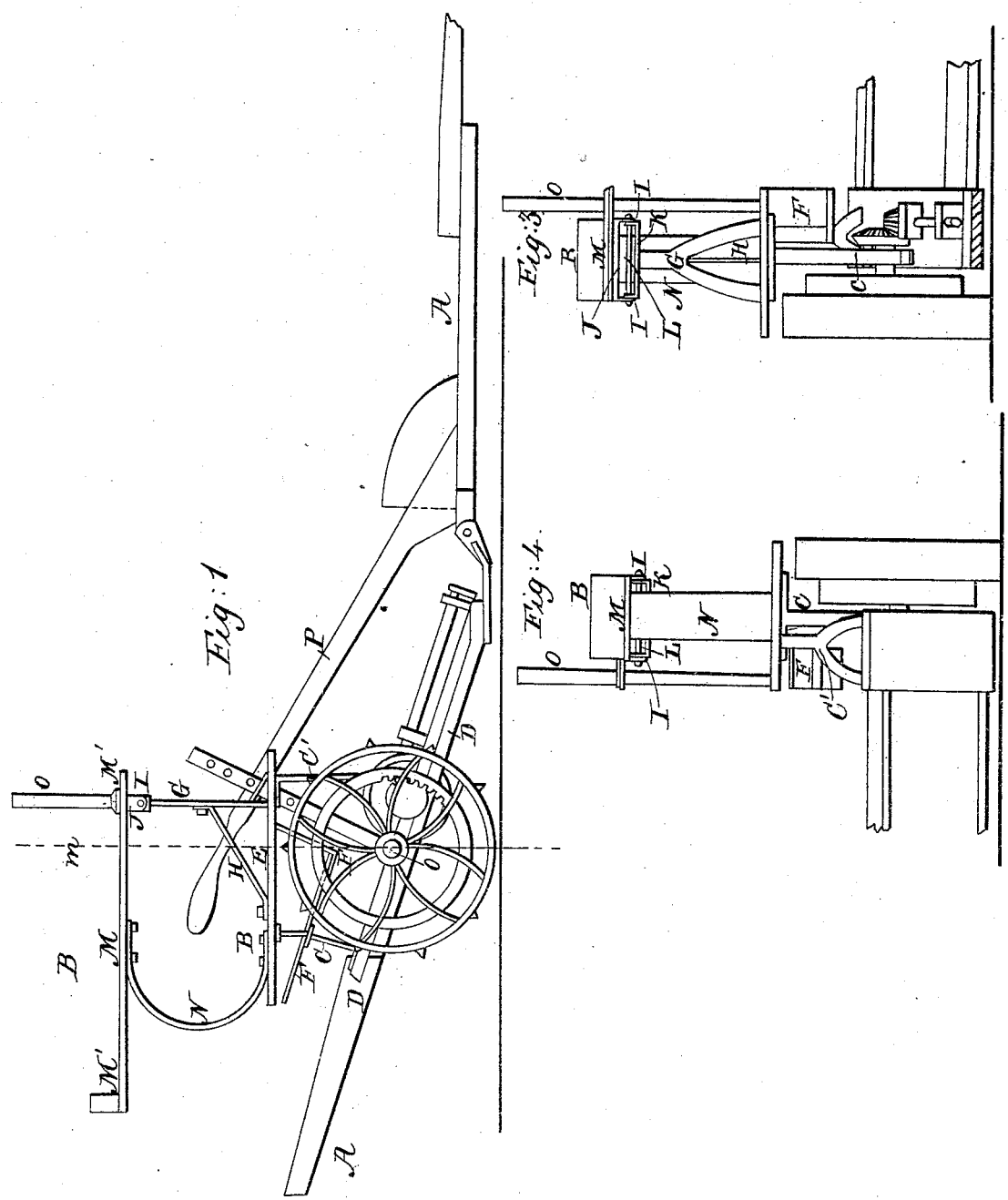

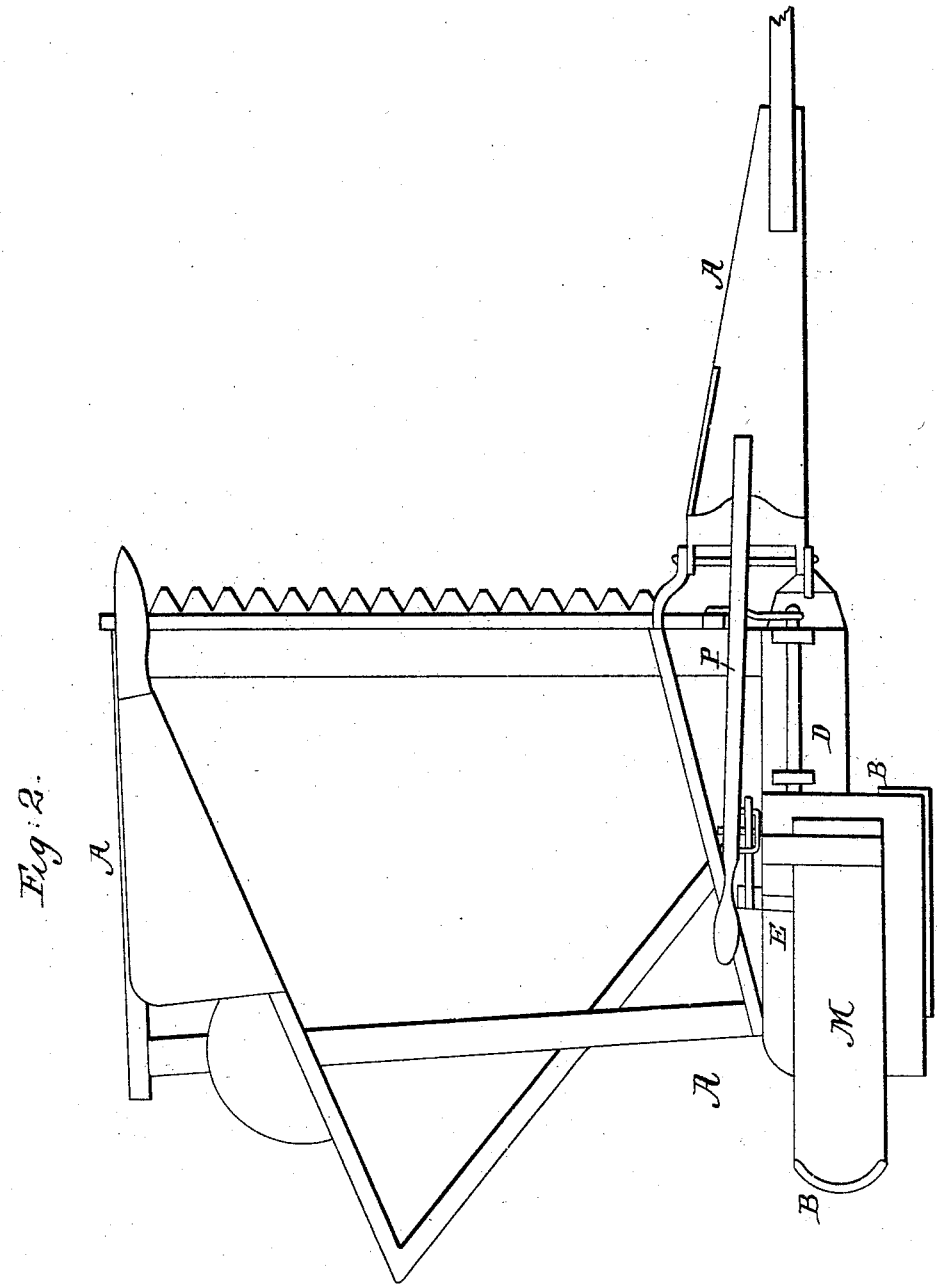

UNITED STATES PATENT OFFICE.

MARCUS E. ELLSWORTH, OF HUDSON, OHIO.

IMPROVEMENT IN REAPING AND MOWING MACHINES.

Specification forming part of Letters Patent No. 18,329, dated October 6, 1857.

*To all whom it may concern:*

Be it known that I, M. E. ELLSWORTH, of Hudson, in the county of Summit and State of Ohio, have invented certain new and useful Improvements in Harvesting and Mowing Machines; and I do hereby declare that the following is a full and exact description thereof, reference being had to the accompanying drawings, in which—

Figure 1 is a side elevation of a harvester with my improvement attached; Fig. 2, a plan view; Fig. 3, a sectional front end view, and Fig. 4 a sectional back end view.

Like letters denote like parts in the different views.

The nature of my invention relates to an improvement in Manny's combined mower and reaper; and it consists in the peculiar manner of constructing the driver's seat and other parts connected therewith and combining the same with said machine, as will be fully described.

A, Figs. 1 and 2, is a general view of Manny's machine, to which may be attached the usual devices employed for mowing and reaping, and to which machine is connected my improved seat B. This seat consists, first, of the standards C C', which are bolted below to the frame-piece D, Fig. 1. To these standards is bolted the foot-board E, and to the standard C and foot-board is secured the foot-rest E, Figs. 3 and 4.

To the foot-board is secured the standard G, from which extends to the foot-board the brace H, which is secured to the standard and foot-board in any desirable manner. This brace aids in strengthening the standard G and keeping the seat in place.

At the top of the standard G is formed a hinge or pin joint, as seen at I I, Figs. 3 and 4. The upper portion or strap J of the joint is fastened to the under side of the seat. The ends of the strap turn down at right angles, as seen in Fig. 3, and correspond with the lower strap, K, which turns up at right angles, forming ears like the upper plate, through which passes the rod L, thus making the joints I I. By means of this joint or its equivalents the driver's seat is connected to the standard G.

The curved spring N is secured to the foot-piece E and seat-board M. As seen in Fig. 1, this spring, in connection with the joints I J, makes the seat yielding and easy for the driver, which is very desirable, as the ordinary method of arranging the seat renders it extremely hard for the driver on account of the jolting of the machine.

The post or stake O is for the purpose of hitching the lines and to aid the driver in moving when on the seat, as it is designed to have the driver sit astride the seat, and a slight movement of the body while there will so change the center of gravity as to raise or depress the cutter-bar, as may be required. The method now in use for raising and lowering is by means of the lever P, Figs. 1 and 2, operated by the driver; and as the driver's seat is placed forward of the axle Q, it follows that he must lift by the lever P nearly the whole of his own weight and about one hundred pounds of the forward weight of the machine. This requires more power than can be ordinarily exerted with the ease and quickness desired, and while the driver's attention is directed to raising or lowering the cutter-bar by the lever P the team is neglected, and vice versa. But in my improved seat all that is required is to incline the body backward or forward, or to move along the seat M back or forward, thereby changing the center of gravity of the machine as may be needed in raising or lowering the cutter-bar. As my improved seat extends from M' to M", this length of seat allows the driver to change his position easily and quickly, so that the machine can be readily adjusted to obstructions.

The ordinary weight of Manny's machine is about one thousand pounds. Three-fourths of this is forward of the axle; hence the difficulty of raising the machine in the ordinary manner, and the advantage of my improvement, by which the weight is reduced about one hundred pounds, and in which the machine is balanced upon the driving and truck wheels, dispensing with the caster, which cuts into the ground, rendering the draft hard for the team and galling their shoulders. The instant the machine is out of standing grass the cutter-bar can be raised above the cut grass, thereby preventing the knives from clogging with cut grass. When in lodged grain or grass the cutter-bar can be easily raised and the machine run back without the aid of the lever P or the driver moving his position on the seat farther than an inclination of the body, without it is hilly; then the driver will move more or less along the seat, as may be required. In case of lodged grass the entire weight of the driver can be applied to the lever P, which would be equal to some four hundred pounds' weight applied to the cutter-bar. Consequently it will mow lodged grass nearly as well as if standing.

In reaping, the driver can carry the cutter-bar high or close to the ground. Consequently in fields with lodged or short grain, in wet, low grounds, or otherwise, the grain can all be so cut as to be suitable in length for binding.

With my improvement there is no danger of being thrown forward and being injured by the machine in passing over uneven ground. The position of the seat is such that the driver can see in time everything which would be likely to obstruct the working of the machine, and its arrangement is such that the caster is depressed with and the machine balanced on the driving and truck wheels, in the manner described, thus rendering the machine much more light and easy of draft, so that it has been determined by practical test that a team of two horses with this machine is as effective as a team of three horses with the ordinary machine.

In my improvement the weight of the driver accomplishes what is ordinarily done with difficulty by him with main strength. The amount of strength required to be exerted to raise the cutter-bar by the lever is so great that it is only done in case of emergency. The length or extension of the seat back of the axle gives an increased leverage over the lever P, and if this lever were increased in length no advantage would be gained, as the old seat of the driver is so fixed that he can only use a certain length of the lever, while by the extension of the seat an increased leverage is obtained by the driver as his position is changed toward M'', and the leverage is decreased as he changes his position toward M'. The increased leverage gained by the seat over the lever is about equal to the distance from M'' to M, as the fulcrum of the lever P is the point of its connection with the frame, and the further advantage of using this leverage by the weight of the driver rather than by physical strength.

By the introduction of my improvement the machine can be turned around with much greater ease than those can be which have the caster-wheel; also, the knives are not as liable to become dull by striking into the ground.

The spring N and the joints I I are devices necessary for the ease and convenience of the driver, as well as for the proper working of the machine.

What I claim as new and my invention, and what I desire to secure by Letters Patent, is—

The above-described seat or stand B, consisting of the seat-board M, spring N, standard G, joint I I, foot board and rest E F, when constructed and arranged in relation to and used in combination with Manny's combined reaper and mower, as herein set forth.

M. E. ELLSWORTH.

Witnesses:
 I. BRAINERD,
 J. LEONARD.